United States Patent
He et al.

(10) Patent No.: US 9,450,234 B2
(45) Date of Patent: Sep. 20, 2016

(54) VOLTAGE CYCLING METHOD FOR LITHIUM ION BATTERY COMPRISING SULFUR POLYMER COMPOSITE IN ACTIVE MATERIAL

(71) Applicants: Xiang-Ming He, Beijing (CN); Li Wang, Beijing (CN); Jian-Jun Li, Beijing (CN); Jian Gao, Beijing (CN); Wen-Ting Sun, Beijing (CN)

(72) Inventors: Xiang-Ming He, Beijing (CN); Li Wang, Beijing (CN); Jian-Jun Li, Beijing (CN); Jian Gao, Beijing (CN); Wen-Ting Sun, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 591 days.

(21) Appl. No.: 13/652,613

(22) Filed: Oct. 16, 2012

(65) Prior Publication Data
US 2013/0307485 A1 Nov. 21, 2013

(30) Foreign Application Priority Data
May 15, 2012 (CN) .......................... 2012 1 0149637

(51) Int. Cl.
*H01M 10/44* (2006.01)
*H02J 7/00* (2006.01)
(Continued)

(52) U.S. Cl.
CPC ............... *H01M 4/364* (2013.01); *H01M 4/38* (2013.01); *H01M 4/604* (2013.01); *H01M 4/608* (2013.01); *H01M 10/052* (2013.01);
(Continued)

(58) Field of Classification Search
CPC .......................... H02J 7/0024; H01M 4/364
USPC .................................................. 320/130, 124
See application file for complete search history.

(56) References Cited

U.S. PATENT DOCUMENTS 4,084,124 A * 4/1978 Kapustka ...................... 320/131
4,224,390 A * 9/1980 Haering .................. H01M 4/02
429/231.1

(Continued)

FOREIGN PATENT DOCUMENTS

CN 1930711 3/2007
CN 1930725 3/2007
(Continued)

OTHER PUBLICATIONS

Fanous et al (Structure-Related Electrochemistry of Sulfur-Poly(acrylonitrile) Composite Cathode Materials for Rechargeable Lithium Batteries, Chem. Mater. 2011, 23, 5024-5028).*
(Continued)

*Primary Examiner* — Drew A Dunn
*Assistant Examiner* — John Trischler
(74) *Attorney, Agent, or Firm* — Zhigang Ma

(57) ABSTRACT

A method for cycling a sulfur composite lithium ion battery includes a step of charging and discharging the sulfur composite lithium ion battery at a first voltage range between a predetermined highest voltage and a predetermined lowest voltage. The lithium ion battery includes an electrode active material. The electrode active material includes a sulfur composite. The step of charging and discharging satisfies at least one conditions of (1) and (2): (1) the predetermined lowest voltage of the first voltage range is larger than a discharge cutoff voltage of the sulfur composite; and (2) the predetermined highest voltage of the first voltage range is smaller than a charge cutoff voltage of the sulfur composite. A method for using a sulfur composite as an electrode active material of a lithium ion battery is also disclosed.

13 Claims, 6 Drawing Sheets

(51) Int. Cl.
  *H01M 4/36*    (2006.01)
  *H01M 4/38*    (2006.01)
  *H01M 4/60*    (2006.01)
  *H01M 10/052*  (2010.01)
  *H01M 10/0525* (2010.01)

(52) U.S. Cl.
  CPC ...... *H01M 10/446* (2013.01); *H01M 10/0525* (2013.01); *Y02E 60/122* (2013.01)

(56) References Cited

U.S. PATENT DOCUMENTS

| | | | | |
|---|---|---|---|---|
| 4,452,777 A * | 6/1984 | Abraham | ............. | H01M 10/39 429/103 |
| 4,668,595 A * | 5/1987 | Yoshino et al. | ......... | 429/231.1 |
| 4,668,596 A * | 5/1987 | Shacklette | ......... | H01M 4/0461 429/213 |
| 4,792,504 A * | 12/1988 | Schwab et al. | ............. | 429/312 |
| 4,830,939 A * | 5/1989 | Lee et al. | ............. | 429/312 |
| 4,935,317 A * | 6/1990 | Fauteux et al. | ............. | 429/310 |
| 4,983,476 A * | 1/1991 | Slane | ............. | H01M 4/136 429/231.3 |
| 5,262,253 A * | 11/1993 | Golovin | ............. | 429/314 |
| 5,300,375 A * | 4/1994 | Chaloner-Gill | ............. | 429/313 |
| 5,370,950 A * | 12/1994 | Kageyama | ............. | 429/232 |
| 5,399,447 A * | 3/1995 | Chaloner-Gill et al. | ...... | 429/304 |
| 5,411,820 A * | 5/1995 | Chaloner-Gill | ............. | 429/307 |
| 5,435,054 A * | 7/1995 | Tonder et al. | ............. | 29/623.5 |
| 5,463,179 A * | 10/1995 | Chaloner-Gill et al. | ...... | 429/314 |
| 5,482,795 A * | 1/1996 | Chaloner-Gill | ............. | 429/316 |
| 5,506,068 A * | 4/1996 | Dan et al. | ............. | 429/50 |
| 5,510,210 A * | 4/1996 | Kim | ............. | H01M 10/3918 429/320 |
| 5,523,667 A * | 6/1996 | Feldstein | ............. | 320/118 |
| 5,536,597 A * | 7/1996 | Takahashi | ............. | C01B 31/02 264/29.1 |
| 5,591,545 A * | 1/1997 | Miyashita | ............. | C04B 35/524 264/29.6 |
| 5,825,156 A * | 10/1998 | Patillon et al. | ............. | 702/63 |
| 5,858,573 A * | 1/1999 | Abraham et al. | ............. | 429/306 |
| 5,998,968 A * | 12/1999 | Pittman et al. | ............. | 320/130 |
| 6,025,094 A * | 2/2000 | Visco | ............. | H01M 4/04 427/126.2 |
| 6,060,862 A * | 5/2000 | Sase et al. | ............. | 320/132 |
| 6,066,899 A * | 5/2000 | Rund | ............. | H02J 9/06 307/10.7 |
| 6,118,248 A * | 9/2000 | Gartstein | ............. | H01M 10/4257 320/107 |
| 6,198,250 B1 * | 3/2001 | Gartstein et al. | ............. | 320/112 |
| 6,200,704 B1 * | 3/2001 | Katz et al. | ............. | 429/218.1 |
| 6,203,947 B1 * | 3/2001 | Peled | ............. | H01M 4/0445 429/221 |
| 6,310,789 B1 * | 10/2001 | Nebrigic et al. | ............. | 363/60 |
| 6,329,789 B1 * | 12/2001 | Gavrilov et al. | ............. | 320/125 |
| 6,372,387 B1 * | 4/2002 | Kawakami et al. | ......... | 429/303 |
| 6,392,385 B1 * | 5/2002 | Barker | ............. | H01M 10/44 320/130 |
| 6,586,940 B2 * | 7/2003 | Asakura et al. | ............. | 324/426 |
| 6,632,573 B1 * | 10/2003 | Nimon | ............. | H01M 4/06 429/199 |
| 6,723,758 B2 * | 4/2004 | Stone et al. | ............. | 521/27 |
| 6,741,065 B1 * | 5/2004 | Ishii | ............. | B60L 11/1816 320/122 |
| 6,835,491 B2 * | 12/2004 | Gartstein | ............. | H01M 6/5044 320/132 |
| 7,019,494 B2 * | 3/2006 | Mikhaylik | ............. | 320/148 |
| 7,541,781 B2 * | 6/2009 | Gamboa | ............. | H02J 7/0031 320/141 |
| 7,645,543 B2 * | 1/2010 | Visco | ............. | H01M 6/04 429/137 |
| 7,648,801 B2 * | 1/2010 | Dahn et al. | ............. | 429/231.95 |
| 7,667,350 B2 * | 2/2010 | Norimatsu | ............. | H01M 8/04544 307/43 |
| 7,722,988 B2 * | 5/2010 | Webber | ............. | 429/221 |
| 7,851,092 B2 * | 12/2010 | Amine | ............. | H01M 4/366 429/212 |
| 7,927,742 B2 * | 4/2011 | Scott | ............. | A61N 1/378 429/221 |
| 7,960,047 B2 * | 6/2011 | Berg | ............. | 429/61 |
| 7,974,797 B2 * | 7/2011 | Shoji | ............. | 702/63 |
| 8,010,250 B2 * | 8/2011 | Borumand et al. | ............. | 701/36 |
| 8,054,038 B2 * | 11/2011 | Kelty et al. | ............. | 320/109 |
| 8,101,302 B2 * | 1/2012 | Lamanna et al. | ............. | 429/307 |
| 8,102,152 B2 * | 1/2012 | Ugaji et al. | ............. | 320/134 |
| 8,138,721 B2 * | 3/2012 | Yang et al. | ............. | 320/133 |
| 8,159,191 B2 * | 4/2012 | Chang et al. | ............. | 320/136 |
| 8,426,061 B2 * | 4/2013 | Nesper | ............. | H01M 4/136 429/209 |
| 8,461,807 B2 * | 6/2013 | Senriuchi et al. | ............. | 320/134 |
| 8,773,069 B2 * | 7/2014 | Tanno | ............. | 320/116 |
| 8,801,810 B1 * | 8/2014 | Cui et al. | ............. | 29/623.1 |
| 8,865,346 B2 * | 10/2014 | He et al. | ............. | 429/211 |
| 8,912,762 B2 * | 12/2014 | Suzuki | ............. | H01M 4/525 320/160 |
| 8,980,453 B2 * | 3/2015 | Scott | ............. | H01M 4/485 320/155 |
| 2002/0001745 A1 * | 1/2002 | Gartstein | ............. | H01M 6/5044 429/61 |
| 2002/0012846 A1 * | 1/2002 | Skotheim et al. | ........ | 429/231.95 |
| 2002/0051911 A1 * | 5/2002 | Okada | ............. | C08L 83/04 429/313 |
| 2003/0113636 A1 * | 6/2003 | Sano et al. | ............. | 429/330 |
| 2003/0129495 A1 * | 7/2003 | Yamato | ............. | C01G 41/00 429/231.1 |
| 2003/0190529 A1 * | 10/2003 | Kim | ............. | H01M 10/052 429/307 |
| 2003/0206021 A1 * | 11/2003 | Laletin et al. | ............. | 324/426 |
| 2004/0048154 A1 * | 3/2004 | Jung | ............. | H01M 4/136 429/212 |
| 2004/0174072 A1 * | 9/2004 | Bourilkov et al. | ............. | 307/66 |
| 2004/0234865 A1 * | 11/2004 | Sato | ............. | H01M 4/13 429/322 |
| 2005/0118496 A1 * | 6/2005 | Chang | ............. | H01M 4/131 429/62 |
| 2005/0147886 A1 | 7/2005 | Mikhaylik | | |
| 2005/0147891 A1 * | 7/2005 | Mikhaylik | ............. | 429/326 |
| 2005/0156575 A1 * | 7/2005 | Mikhaylik | ............. | 320/137 |
| 2005/0167474 A1 * | 8/2005 | Kanno | ............. | B23K 20/10 228/183 |
| 2005/0227143 A1 * | 10/2005 | Amine | ............. | H01M 6/166 429/188 |
| 2006/0008700 A1 * | 1/2006 | Yong et al. | ............. | 429/144 |
| 2006/0238203 A1 * | 10/2006 | Kelley et al. | ............. | 324/433 |
| 2007/0029970 A1 * | 2/2007 | Barsukov et al. | ............. | 320/130 |
| 2007/0108944 A1 * | 5/2007 | Pellenc | ............. | H02J 7/0013 320/130 |
| 2007/0188142 A1 * | 8/2007 | Nakashimo | ............. | 320/130 |
| 2007/0212596 A1 * | 9/2007 | Nebrigic et al. | ............. | 429/61 |
| 2008/0265841 A1 * | 10/2008 | Kim | ............. | 320/132 |
| 2008/0318128 A1 * | 12/2008 | Simoneau et al. | ............. | 429/229 |
| 2009/0140695 A1 * | 6/2009 | Mrazek | ............. | H01M 10/06 320/130 |
| 2009/0251103 A1 * | 10/2009 | Yamamoto et al. | ............. | 320/133 |
| 2009/0305135 A1 * | 12/2009 | Shi et al. | ............. | 429/217 |
| 2010/0079110 A1 * | 4/2010 | Hamamoto et al. | ......... | 320/130 |
| 2010/0233546 A1 * | 9/2010 | Nesper | ............. | H01M 4/136 429/231.95 |
| 2010/0253278 A1 * | 10/2010 | Chang et al. | ............. | 320/101 |
| 2011/0101924 A1 * | 5/2011 | Oh et al. | ............. | 320/162 |
| 2011/0104553 A1 * | 5/2011 | Pol | ............. | B82Y 30/00 429/156 |
| 2011/0143197 A1 * | 6/2011 | Ohtsuka | ............. | H01M 4/137 429/207 |
| 2011/0165466 A1 * | 7/2011 | Zhamu et al. | ............. | 429/231.8 |
| 2011/0236751 A1 * | 9/2011 | Amiruddin | ......... | H01M 4/0447 429/188 |
| 2011/0262810 A1 * | 10/2011 | Lemmon | ............. | H01M 4/134 429/216 |
| 2012/0045687 A1 | 2/2012 | Wang et al. | | |
| 2012/0056590 A1 * | 3/2012 | Amiruddin | ............. | H01M 4/505 320/130 |

(56) References Cited

U.S. PATENT DOCUMENTS

| | | | |
|---|---|---|---|
| 2012/0059128 A1* | 3/2012 | He et al. .................... 525/329.1 |
| 2012/0211367 A1* | 8/2012 | Vecitis .................. B82Y 30/00 |
| | | | 204/554 |
| 2012/0231352 A1* | 9/2012 | Pol ........................ B82Y 30/00 |
| | | | 429/341 |
| 2012/0234694 A1* | 9/2012 | Vecitis .............. B01D 39/2055 |
| | | | 205/747 |
| 2012/0244446 A1* | 9/2012 | Barbarich et al. ............ 429/338 |
| 2013/0017449 A1* | 1/2013 | Yasuda ................. H01M 4/525 |
| | | | 429/231.8 |
| 2013/0059174 A1* | 3/2013 | Zhamu ................. H01M 4/583 |
| | | | 429/50 |
| 2013/0141050 A1* | 6/2013 | Visco et al. ................... 320/130 |
| 2013/0221906 A1* | 8/2013 | Imblum .......................... 320/107 |
| 2013/0342172 A1* | 12/2013 | Huang ........................... 320/162 |
| 2014/0047707 A1* | 2/2014 | Zhang et al. ............... 29/623.1 |
| 2014/0147738 A1* | 5/2014 | Chen ..................... H01M 4/364 |
| | | | 429/188 |
| 2014/0225041 A1* | 8/2014 | Archer ................. H01M 4/364 |
| | | | 252/503 |
| 2014/0377664 A1* | 12/2014 | Yersak .............. H01M 10/0562 |
| | | | 429/305 |
| 2015/0010822 A1* | 1/2015 | Nakahara ............ H01M 4/0438 |
| | | | 429/221 |
| 2016/0013463 A1* | 1/2016 | Roumi ................. G01R 31/361 |
| | | | 429/145 |

FOREIGN PATENT DOCUMENTS

| | | |
|---|---|---|
| CN | 101465441 A | 6/2009 |
| CN | 101479911 | 7/2009 |
| CN | 101764258 | 6/2010 |
| CN | 102376941 | 3/2012 |
| CN | 102399338 | 4/2012 |

OTHER PUBLICATIONS

"Batteries in a Portable World," Isidor Buchmann, Cadex Electronics, Chp 8, p. 177, Published 2011, print.*

Lu et al., Study of Lithium Ion Battery Formation Technology, Chemical Engineering & Equipment, 2011, vol. 9, p. 46-47.

Chen et al., Study Progress of Secondary Lithium Ion Battery Sulfur Based Cathode Materials, New Material Industry, 2010, vol. 10, p. 15-19.

* cited by examiner

US 9,450,234 B2

VOLTAGE CYCLING METHOD FOR LITHIUM ION BATTERY COMPRISING SULFUR POLYMER COMPOSITE IN ACTIVE MATERIAL

CROSS-REFERENCE TO RELATED APPLICATIONS

This application claims all benefits accruing under 35 U.S.C. §119 from China Patent Application No. 201210149637.8, filed on May 15, 2012, in the China Intellectual Property Office, the disclosure of which is incorporated herein by reference.

BACKGROUND

1. Technical Field

The present disclosure relates to cycling methods for sulfur composite lithium ion batteries.

2. Description of Related Art

The sulfur composite cathode active materials have great potential for high-performance lithium ion batteries due to their large specific capacity, abundant resources and low cost.

Unlike conventional cathode active materials, such as lithium transition metal oxides, the volumes of the cathode electrodes using the sulfur composites are likely to expand and shrink during the cycling of lithium ion batteries. It was found that the sulfur composite cathode electrodes expanded when discharging and shrank when recharging. The volume change during cycling makes the lithium ion batteries unstable. Due to the volume change, the sulfur composites in the cathode electrodes may be detached from the conducting agents and lose electrical activity. Accordingly, the capacity of the lithium ion batteries may decrease greatly with the cycling times. This causes a low capacity retention and coulombic efficiency of the sulfur composite lithium ion batteries.

What is needed, therefore, is to provide a method for cycling a sulfur composite lithium ion battery to suppress the volume change, which increases the coulombic efficiency and capacity retention of the lithium ion battery.

BRIEF DESCRIPTION OF THE DRAWINGS

Many aspects of the present disclosure can be better understood with reference to the following drawings. The components in the drawings are not necessarily to scale, the emphasis instead being placed upon clearly illustrating the principles of the present embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean at least one.

Figure 4:
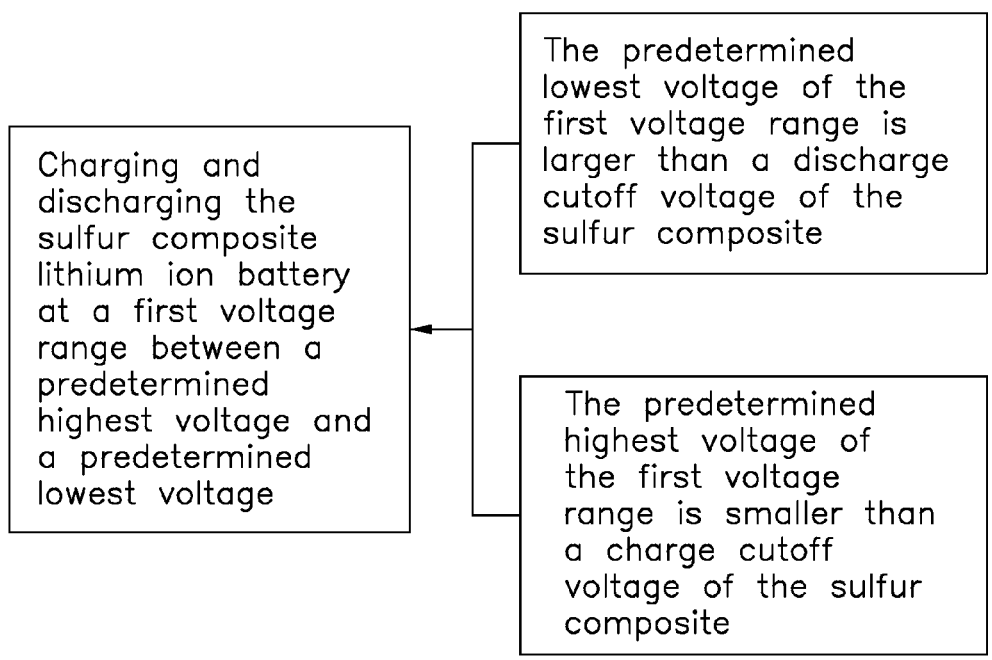
FIG. 4 shows a flow chart of one embodiment of a method for cycling a sulfur composite lithium ion battery.

Referring to FIG. 4, a method for cycling a sulfur composite lithium ion battery includes a step of charging and discharging a lithium ion battery at a first voltage range between a predetermined highest voltage and a predetermined lowest voltage. The lithium ion battery includes an electrode active material. The electrode active material includes a sulfur composite. The step of charging and discharging satisfies at least one condition of (1) and (2):

(1) the predetermined lowest voltage of the first voltage range is larger than a discharge cutoff voltage of the sulfur composite; and (2) the predetermined highest voltage of the first voltage range is smaller than a charge cutoff voltage of the sulfur composite.

During the charging and discharging of the lithium ion battery, the voltage of the lithium ion battery increases when charging and decreases when discharging. The lithium ion battery cannot always be charged or discharged. There will be a predetermined voltage range of the lithium ion battery for charging and discharging. The predetermined voltage range is defined between a predetermined highest voltage and a predetermined lowest voltage. When the voltage of the lithium ion battery is charged to the predetermined highest voltage, the charging stop. When the voltage of the lithium ion battery is discharged to the predetermined lowest voltage, the discharging will stop. Therefore, the lithium ion battery is cycled between the predetermined highest voltage and the predetermined lowest voltage (i.e., cycled in the predetermined voltage range). The charging current and discharging current can be a permanent value during the entire charging and discharging period, or at least during a period of the charging and discharging. In this specification, the predetermined voltage range between the predetermined highest voltage and the predetermined lowest voltage is defined as a first voltage range.

The discharge cutoff voltage is the voltage when the reversible redox reaction of the electrode active material during discharging is completely processed, and below which the structure of the electrode active material will be destroyed. At the discharge cutoff voltage, the lithium ion battery is considered fully discharged. The charge cutoff voltage is the voltage when the reversible redox reaction of the electrode active material during charging is completely processed, and above which the structure of the electrode active material will be destroyed. At the charge cutoff voltage, the lithium ion battery is considered fully charged. The charge cutoff voltage and the discharge cutoff voltage depend on the electrode active material. Different sulfur composites may have different charge cutoff voltages and the discharge cutoff voltages.

The lithium ion battery was commonly cycled between the charge cutoff voltage and the discharge cutoff voltage. However, in the present method, the sulfur composite lithium ion battery is first cycled in the first voltage range. The first voltage range is smaller than and located in a range between the charge cutoff voltage and the discharge cutoff voltage. By first cycling the sulfur composite lithium ion battery at the first voltage range, the volume change of the sulfur composite lithium ion battery during cycling between the charge cutoff voltage and the discharge cutoff voltage can be suppressed.

The step of charging and discharging the lithium ion battery at the first voltage range can be processed once the sulfur composite lithium ion battery is produced. That is to say, sulfur composite lithium ion battery has its first cycle or first plurality of cycles at the first voltage range.

If the condition (1) is satisfied, the predetermined highest voltage of the first voltage range can be smaller than or equal to the charge cutoff voltage of the sulfur composite. If the condition (2) is satisfied, the predetermined lowest voltage of the first voltage range can be larger than or equal to the discharge cutoff voltage of the sulfur composite. However, the first voltage range is always smaller than and located in the range between the charge cutoff voltage and the discharge cutoff voltage. In one embodiment, the first voltage range is about 30% to about 50% smaller than the range between the charge cutoff voltage and the discharge cutoff voltage.

The cycling number for the sulfur composite lithium ion battery at the first voltage range is not limited. In one embodiment, the sulfur composite lithium ion battery is cycled at the first voltage range for at least 5 cycles.

The predetermined highest voltage and/or the predetermined lowest voltage can be chosen by the reversible redox reactions of the sulfur composite occurred during charging and discharging. Specifically, if the sulfur composite lithium ion battery has a plurality of reversible redox reactions at different voltages, the first voltage range can only have one reversible redox reaction processed during the charging and discharging. That is to say, the first voltage range can exclude the reacting voltages for the other reversible redox reactions. For example, if the sulfur composite lithium ion battery has two reversible redox reactions respectively at two voltages (V1 and V2, V1<V2) during charging and at two voltages (V3 and V4, V3<V4) during discharging, in which the predetermined lowest voltage Vx and the voltage predetermined highest voltage Vy can satisfy V1<Vx<V2<Vy and V3<Vx<V4<Vy, or satisfy Vx<V1<Vy<V2 and Vx<V3<Vy<V4.

Figure 5:
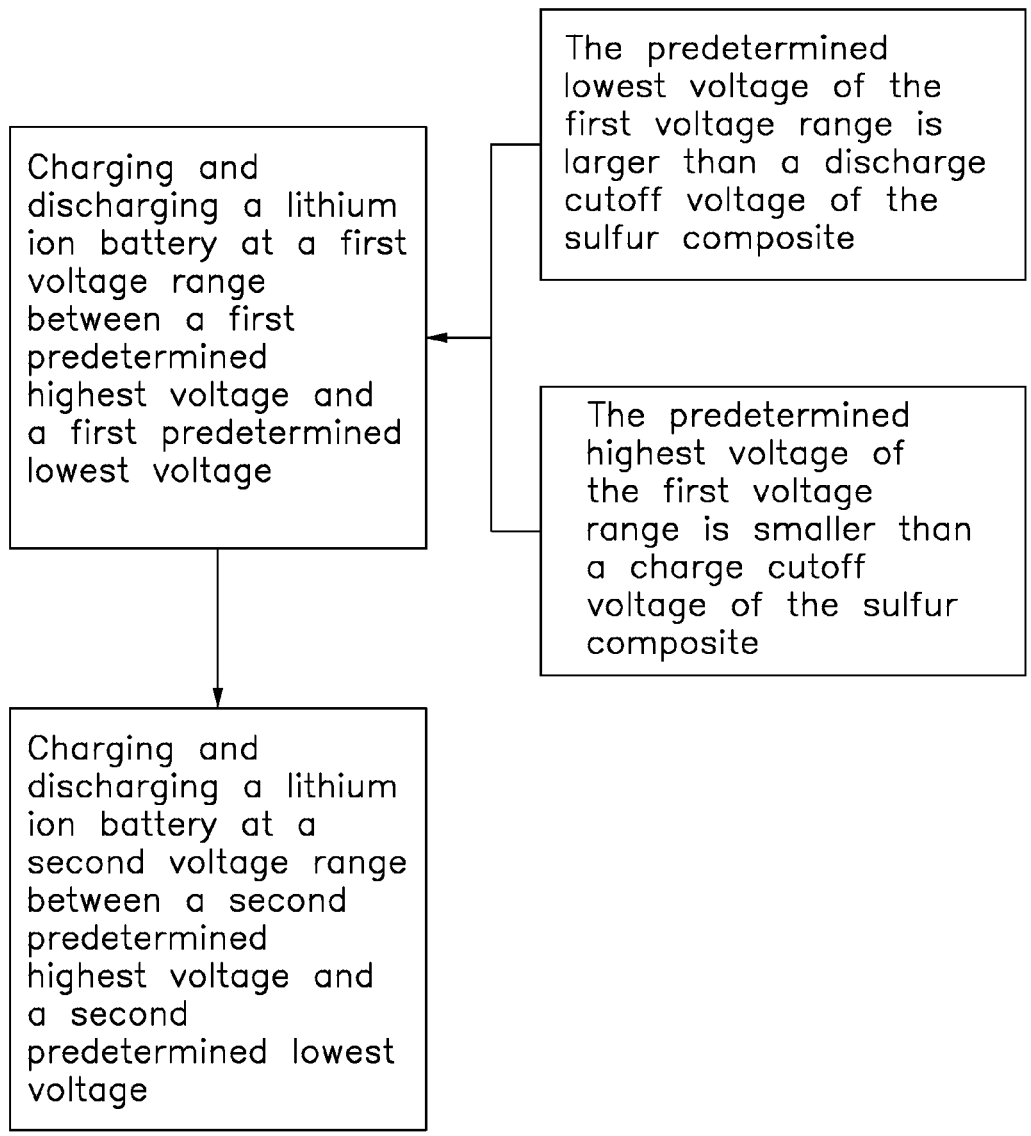
FIG. 5 shows a flow chart of one embodiment of a method for using a sulfur composite as an electrode active material of a lithium ion battery.

Referring to FIG. 5, a method for using a sulfur composite as an electrode active material of a lithium ion battery includes:

S1, charging and discharging a lithium ion battery at a first voltage range between a first predetermined highest voltage and a first predetermined lowest voltage, the lithium ion battery including an electrode active material, the electrode active material including a sulfur composite; and S2, after the step S1, charging and discharging a lithium ion battery at a second voltage range between a second predetermined highest voltage and a second predetermined lowest voltage, wherein the step S1 satisfies at least one conditions of (1) and (2):

(1) the first predetermined lowest voltage of the first voltage range is larger than the second predetermined lowest voltage of the second voltage range; and (2) the first predetermined highest voltage of the first voltage range is smaller than the second predetermined highest voltage of the second voltage range.

The lithium ion battery is firstly cycled at a narrow voltage range and then cycled at a wider voltage range.

If the condition (1) is satisfied, the first predetermined highest voltage of the first voltage range can be smaller than or equal to the second predetermined highest voltage of the second voltage range. If the condition (2) is satisfied, the first predetermined lowest voltage of the first voltage range can be larger than or equal to the second predetermined lowest voltage of the second voltage range. In one embodiment, the first voltage range is about 30% to about 50% smaller than the second voltage range.

The second predetermined highest voltage of the second voltage range can be smaller than or equal to the charge cutoff voltage of the cathode active material. The second predetermined lowest voltage of the second voltage range can be larger than or equal to the discharge cutoff voltage of the anode active material.

In the sulfur composite lithium ion battery, the sulfur composite can be used as the cathode active material or the anode active material. When the cathode active material of the cathode electrode includes the sulfur composite, the anode active material of the anode electrode can be a commonly used anode active material such as lithium metal, lithium titanate (e.g., $Li_4Ti_5O_{12}$), graphite, acetylene black, organic cracking carbon, mesocarbon microbeads (MCMB), or any combination thereof. When the anode active material of the anode electrode includes the sulfur composite, the cathode active material of the cathode electrode can be a commonly used cathode active material such as the layer typed lithium cobalt oxides (e.g., $LiCoO_2$), layer typed lithium nickel oxides (e.g., $LiNiO_2$), spinel type materials (e.g., $LiMn_2O_4$), lithium cobalt phosphates (e.g., $LiCoPO_4$), and lithium nickel phosphates (e.g., $LiNiPO_4$).

The sulfur composite can be a sulfur based polymer. The sulfur based polymer is a product formed from a pyrolysis reaction, dehydrogenation and carbonation reaction, dehydration reaction, dehydrochlorination reaction or deamination reaction of a mixture of conducting polymer and elemental sulfur. The conducting polymer can be sulfurized by the elemental sulfur. The formed sulfur based polymer can include a conducting matrix and sulfur dispersed in the conducting matrix. The sulfur dispersed in the conducting matrix can be combined with the conducting matrix with a covalent bond. The sulfur dispersed in the conducting matrix can also be elemental sulfur composited with the conducting matrix. The sulfur based polymer can be at least one of sulfur grafted poly(pyridinopyridine), sulfurized polystyrene, sulfurized polyoxyethylene, sulfurized polyvinyl alcohol, sulfurized poly(vinylidene chloride), sulfurized poly (vinylidene difluoride), sulfurized polyvinylchloride, sulfurized polyvinyl fluoride, sulfurized poly(1,2-dichloroethylene), sulfurized poly(1,2-difluoroethylene), sulfurized polymethyl methacrylate, and sulfurized phenolic resin. The sulfur based polymer can be further lithiated.

In one embodiment, the sulfur based polymer is sulfur grafted poly(pyridinopyridine) (SPPY). The SPPY includes a poly(pyridinopyridine) (PPY) matrix and sulfur dispersed in the PPY matrix. In one embodiment, a weight percentage of the sulfur in the SPPY is equal to or smaller than 41%.

A material of the PPY matrix includes a chemical group of formula (1):

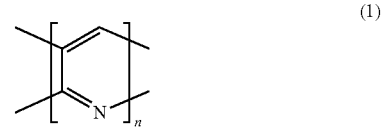

(1)

wherein n is an integer larger than 1.

The PPY matrix is formed from a cyclizing reaction of polyacrylonitrile (PAN).

The sulfur dispersed in the PPY matrix can be combined with the PPY matrix as a dopant. That is to say, the sulfur is combined with the PPY matrix with a covalent bond. The sulfur can exist as a "poly-sulfur group" consisting of one or more sulfur elements, which can be represented by a formula of $S_x$, wherein x is an integer between 1 and 8. In one embodiment, 2≤x≤8 (e.g., x=4). If the "poly-sulfur group" includes more than one sulfur element, the sulfur elements can be connected to each other as a chain. For example, if x=4, a formula of the "poly-sulfur group" is —S—S—S—S—, and if x=8, a formula of the "poly-sulfur group" is —S—S—S—S—S—S—S—S—, wherein "—" represents a covalent bond. The SPPY can include a plurality of the poly-sulfur groups dispersed in the PPY matrix and combined with the PPY matrix with the covalent bonds.

In one embodiment, the $S_x$ is doped in the chemical group of formula (1) and covalent bonded with a carbon element thereof. For example, the SPPY can include a chemical group of formula (2):

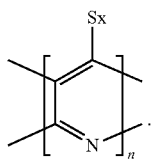

(2)

The molecular weight of the SPPY can be equal to or larger than 188.

The $S_x$ can also be covalently bonded with other functional groups at the other side of the sulfur chain. For example, the SPPY can include a chemical group of formula (3):

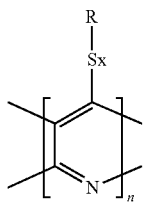

(3)

wherein R represents a functional group.

In the chemical group of formula (3), R is not limited and can be selected as needed, such as carboxyl groups, hydroxyl groups, and aromatic groups.

In another embodiment, R can also be the chemical groups of formula (1) or formula (2). For example, the SPPY can include a chemical group of formula (4):

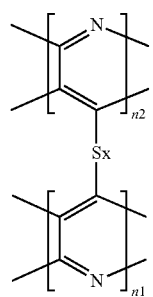

(4)

wherein n1 and n2 are both integers larger than 1, and n1 and n2 can be the same or different.

The chemical group of formula (4) is formed by two chemical groups of formula (1) connected by the $S_x$. Further, in the chemical group of formula (4), the two connected pyridinopyridine groups

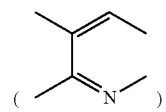

belong to different chemical groups of formula (1).

In another embodiment, the two connected pyridinopyridine groups can also belong to the same chemical group of formula (1). The two connected pyridinopyridine groups can be adjacent to each other or spaced by other pyridinopyridine groups.

For example, the SPPY can include a chemical group of formula (5) having two adjacent pyridinopyridine groups connected by $S_x$:

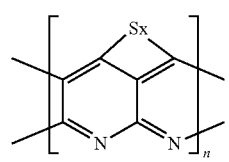

(5)

When the two pyridinopyridine groups connected by $S_x$ are spaced, the SPPY can include a chemical group of formula (6):

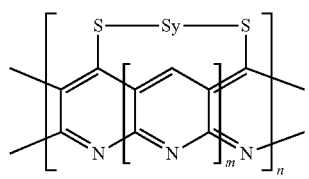

(6)

wherein $S_y$ is also a "poly-sulfur group" including a sulfur chain, m and y are both an integer larger than 0. In one embodiment, m≤y≤6.

In another embodiment, the sulfur dispersed in the PPY matrix can be elemental sulfur composited with the PPY matrix. The elemental sulfur can have a shape of particles or grains. A size of the elemental sulfur particle can be very small. In one embodiment, one elemental sulfur particle can be one sulfur molecule (e.g., a $S_8$ ring). In another embodiment, one elemental sulfur particle can be a sulfur atom cluster consisting of a plurality of sulfur atoms. For example, the sulfur atom cluster can be $S_x$, wherein x is an integer between 1 and 7. As a large amount of the elemental sulfur particles are uniformly dispersed in the PPY matrix, and each elemental sulfur particle can be a sulfur molecule or sulfur atom cluster, the sulfur can be seen as monodispersed in the PPY matrix.

The SPPY can include the "poly-sulfur group" and the elemental sulfur. In the above formulas (1) to (6), the larger the value of n, n1, and n2, the more the pyridinopyridine groups are in the PPY matrix, the longer the chain of the pyridinopyridine groups, and the better the conductivity of the SPPY.

One embodiment of a method for making the SPPY includes steps of:

S1, mixing an elemental sulfur with a PAN to form a mixture;

S2, sintering the mixture in a sealed container filled with a protective gas at a temperature of about 320° C. to about 400° C., to form a sintered product; and S3, heating the sintered product to a temperature above a sublimation temperature to remove at least a part of unreacted elemental sulfur from the sintered product.

In the step S1, the elemental sulfur and the PAN can both have a shape of powder or particles. The powder or particles of the elemental sulfur and the PAN can be uniformly mixed by mechanically stirring. The molecular weight of the PAN is not limited, and can be in a range from 1000 to 100000.

In the step S2, the elemental sulfur is heated to the gas state and uniformly contacting with the surface of the PAN. At the same time, the PAN has a pyrolysis and a cyclizing process during the sintering. The sulfur that is in contact with the PAN is reacted with or combined with the cyclized PAN, and thus forming the SPPY. In the SPPY, a majority of the sulfur is the "poly-sulfur group" covalently bonded with the PPY matrix. A comparison of Raman spectra of the sintered product, the elemental sulfur, and the pyrolytic pure PAN shows that compared with the two absorption peaks corresponding to the two C—C bonds (often referred to as G-band and D-band) of pyrolytic pure PAN, the two similar absorption peaks in the sintered product shift to lower wave numbers, which shows that the sulfur and the PPY matrix are bonded by C—S covalent bonds.

The protective gas can be an inert gas or a nitrogen gas. In the sealed container, the elemental sulfur will not leak out during the sintering. Further, due to the gasification of the elemental sulfur, the gas pressure in the sealed container can be larger than 1 atmospheric pressure. Therefore, the sealed container can promote the uniform dispersion of the sulfur in the sintered product.

At a temperature of about 320° C. to about 400° C., the PAN can be fully cyclized to form a plurality of pyridinopyridine groups joined together, such that the n of formula (2) can be equal to or larger than 10. In one embodiment, the sintering temperature is about 350° C. The sintering time can be determined by the amount of the mixture, and can be in a range from about 1 hour to about 10 hours. In one embodiment, the mixture is sintered in a sealed autoclave at a temperature of 350° C. for about 2 hours, and the weight percentage of the sulfur in the sintered product is about 47%.

In the step S3, the heating temperature is about 150° C. to about 170° C. In the sintering step of S2, the elemental sulfur may not totally react with the PAN, and still remain as a relatively large particle in the sintered product. During the step S3, the unreacted elemental sulfur in the relatively large size can be completely or at least partially removed from the sintered product. However, the poly-sulfur group and the elemental sulfur in small particle size would not be removed. Thus, the weight percentage of the sulfur in the SPPY is equal to or less than 41%. Sulfur is an active material in the charge/discharge process of the lithium ion battery. The removal of large sized elemental sulfur can dramatically increase the capacity retention of the lithium ion battery.

The heating time of the step S3 can be determined by the amount of the sintered product (e.g., about 30 minutes to about 4 hours). In one embodiment, the sintered product is heated in vacuum at a temperature of about 150° C. for about 1 hour until the final product has a constant weight. The sulfur is about 41% of the final product.

Figure 1:
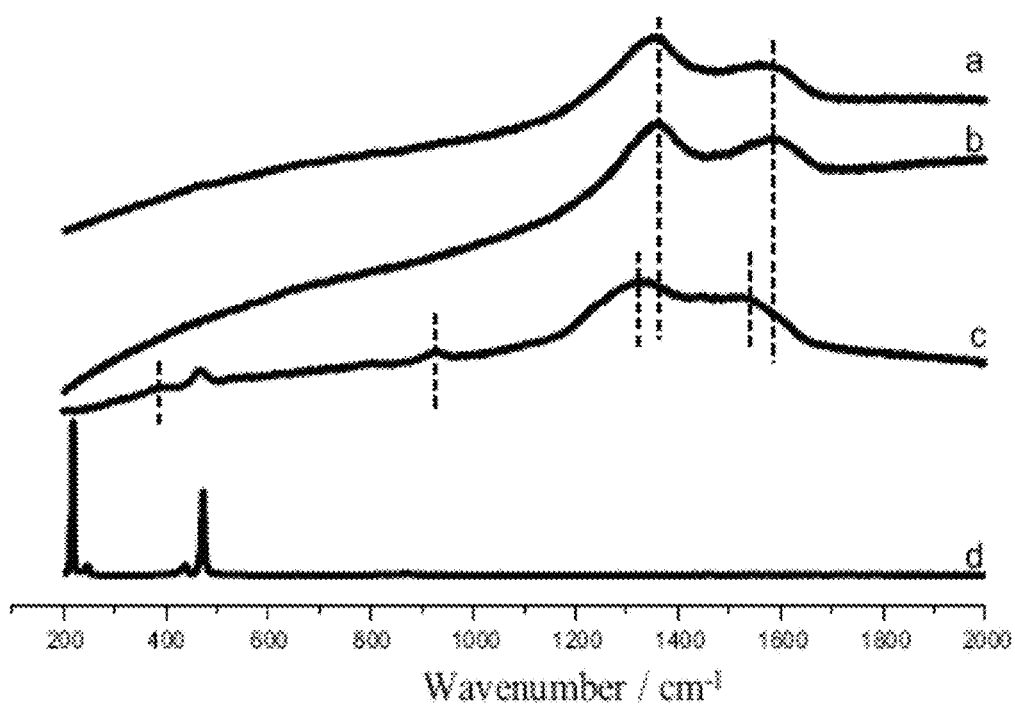
FIG. 1 shows a Raman spectra of (a) pyrolytic PAN in argon atmosphere, (b) pyrolytic PAN in air, (c) SPPY, and (d) elemental sulfur.

Referring to FIG. 1, the final product having the step of S3 is compared with the elemental sulfur and the pyrolytic pure PAN in the Raman spectra. In FIG. 1, the curve a is the Raman spectra of the pyrolytic pure PAN formed by having pure PAN sintered in an Ar gas, the curve b is the Raman spectra of the pyrolytic pure PAN formed by having pure PAN sintered in air, the curve c is the Raman spectra of the final product having the heating step of S3 in vacuum, and the curve d is the Raman spectra of the elemental sulfur. FIG. 1 shows that the curves a and b both have main bands at 1582 cm$^{-1}$ and 1375 cm$^{-1}$, which are often referred to as the G mode and D mode, respectively. However, these bands (387 cm$^{-1}$ and 928 cm$^{-1}$) in the curve c (i.e., for SPPY) shift to a lower wavenumber, which indicates that the sulfur and the PPY matrix are bonded by C—S covalent bonds.

Figure 6:
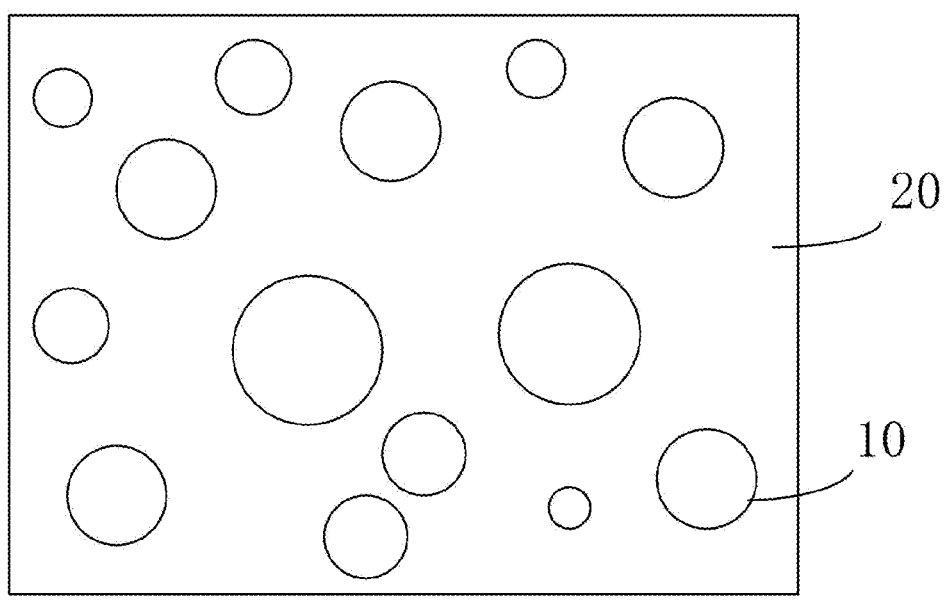
FIG. 6 shows a schematic view of elemental sulfur particles and PPY matrix.

Further, after the steps S2 and S3, the method can further include a step S4 of electrochemically reducing the "poly-sulfur group" of $S_x$ into elemental sulfur. The reducing voltage for the electrochemically reducing "poly-sulfur group" of $S_x$ can be about 1.7 V to about 1.75 V (vs. Li$^+$/Li). In one embodiment, the final product can be arranged in an electrochemical reactor (e.g., in an electrochemical battery) as an anode electrode, and then the battery is discharged at a voltage of about 1.7 V to about 1.75 V (vs. Li$^+$/Li). In one embodiment, the counter electrode is lithium metal, the battery is discharged using a constant current density of about 20 mA/g until the battery reaches a discharge cut-off voltage of about 0V. The "poly-sulfur group" has one or more sulfur elements (smaller than 8), and the "poly-sulfur group" is joined to the carbon atoms of the PPY matrix by covalent bonds. Thus, due to the electrochemically reducing step, the covalent bonds are broken, and a plurality of elemental sulfur particles, each of which is one sulfur molecule (e.g., a $S_8$ ring) or a sulfur atom cluster having 1 to 7 sulfur atoms can be formed. Referring to FIG. 6, the plurality of elemental sulfur particles 10 are uniformly dispersed in the PPY matrix 20. However, the electrochemically reducing step of the step S4 is an irreversible reaction. The elemental sulfur particles cannot be joined to the carbon atoms of the PPY matrix again by covalent bonds through an electrochemically oxidizing step.

Figure 2:
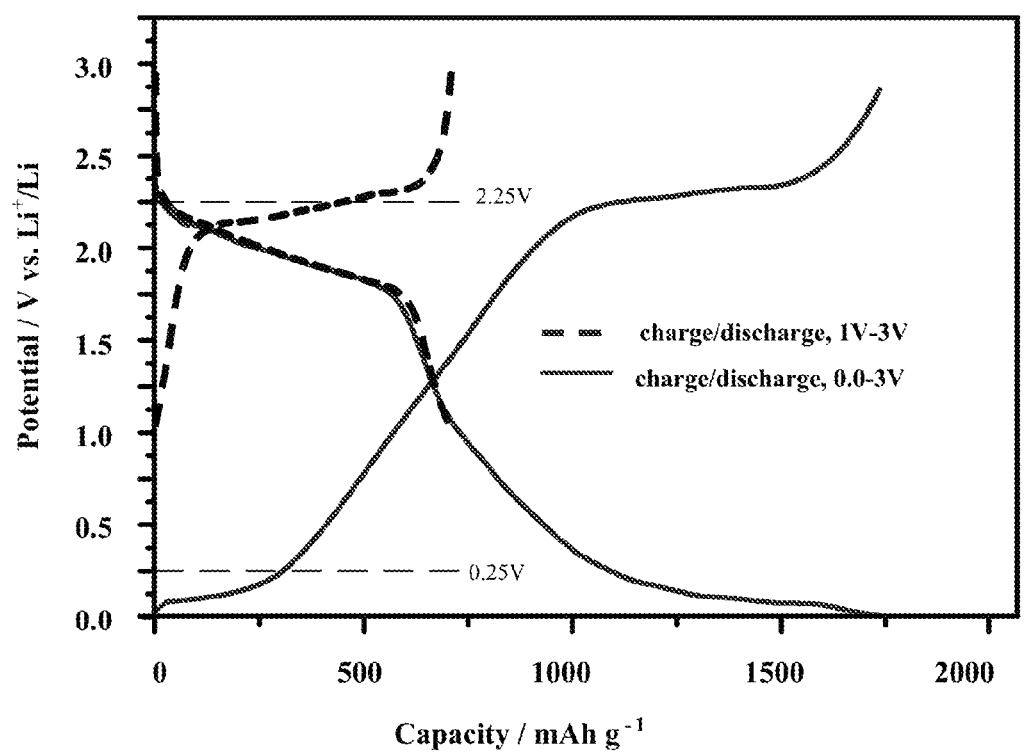
FIG. 2 shows discharge and charge curves of an embodiment of a lithium ion battery.

Referring to FIG. 2, a lithium ion battery using the SPPY as the anode active material and the lithium metal as the counter electrode is assembled. The lithium ion battery is cycled using a constant current in a galvanostatic charge/discharge measurement. As shown in the charge/discharge curves of the lithium ion battery in FIG. 2, the curves have plateaus between a voltage range of about 0.1V to about 0.25V. Therefore, the SPPY in the voltage range of about 0.1V to about 0.25V has a reversible redox reaction and a reversible charge/discharge capacity, and can be used as an anode active material of the lithium ion battery. More specifically, the SPPY has a discharge process at about 2 V and a charge process at about 2.25 V. Therefore, in the lithium ion battery, the predetermined lowest voltage Vx and the predetermined highest voltage Vy can satisfy 0.25<Vx<2.25V<Vy, or satisfy Vx<0.1V<Vy<2V.

When the SPPY is used as the anode active material, the cathode active material can be selected from the cathode active materials having a relatively high discharge voltage (e.g., larger than or equal to about 4 V vs. Li$^+$/Li). More specifically, the cathode active material can be at least one of the spinel type materials, lithium cobalt phosphates, and lithium nickel phosphates.

The spinel type materials can be represented by a formula of $Li_zM_aN_bO_4$, wherein $0.1 \leq z \leq 1.1$, and $a+b=2$, M and N are selected from alkaline-earth metal elements, Group-13 elements, Group-14 elements, transition metal elements, and rare-earth elements. In one embodiment, the M and N are selected from iron (Fe), copper (Cu), manganese (Mn), nickel (Ni), chromium (Cr), cobalt (Co), vanadium (V), titanium (Ti), aluminum (Al), Zinc (Zn), gallium (Ga), and magnesium (Mg).

For example, the spinel type material can be $Li_zNiVO_4$, $Li_zM_xMn_{2-x}O_4$, $Li_zNi_{0.5-y}Cu_yMn_{1.5}O_4$, $Li_zFe_{0.5-y}Cr_yMn_{1.5}O_4$, and $Li_zAl_{0.5-y}Cr_yMn_{1.5}O_4$, wherein $0<x<2$ and $0<y<0.5$. In $Li_zM_xMn_{2-x}O_4$, M can be at least one of Cr, Co, Fe, Al, Ni and Cu, and (e.g., $LiNi_{0.5}Mn_{1.5}O_4$ and $LiCr_{0.5}Mn_{1.5}O_4$).

The lithium cobalt phosphates can be represented by a formula of $Li_zCo_{1-k}M_kPO_4$, wherein $0.1 \leq x \leq 1.1$, $0 \leq k \leq 0.9$, M can be at least one of Fe, Cu, Mn, Cr, V, Ti, Al, Zn, Ni, Ga, and Mg.

The lithium nickel phosphates can be represented by a formula of $Li_zNi_{1-k}M_kPO_4$, wherein $0.1 \leq x \leq 1.1$, $0 \leq k \leq 0.9$, M can be at least one of Fe, Cu, Mn, Cr, V, Ti, Al, Zn, Co, Ga, and Mg.

Figure 3:
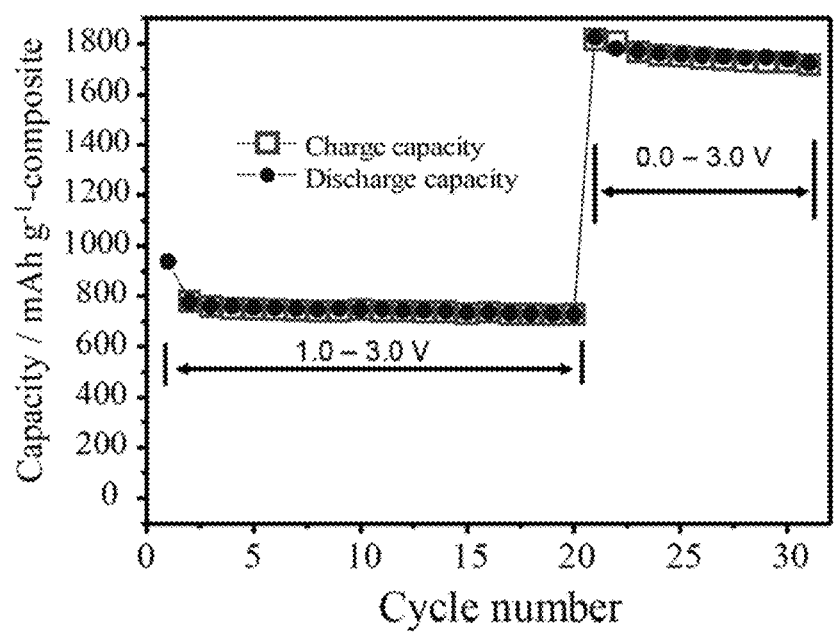
FIG. 3 shows a cycling performance of an embodiment of a lithium ion battery cycled in two different voltage ranges.

Referring to FIG. 3, in one embodiment, the lithium ion battery using the SPPY as the cathode active material is firstly cycled between 1V and 3V for 20 cycles, and then cycled between 0 V and 3 V for 100 cycles. The discharge capacity of the lithium ion battery is about 1700 mAh/g at the $10^{th}$ cycle between 0 V and 3 V, and is about 1600 mAh/g at the $100^{th}$ cycle between 0 V and 3 V. The maximum volume change percentage of the lithium ion battery during the cycling is about 20% of the original volume.

In another embodiment, a same lithium ion battery is cycled between 0.1V and 3V for about 20 cycles, and then cycled between 0 V and 3 V for about 100 cycles. The discharge capacity of the lithium ion battery is about 1500 mAh/g at the $10^{th}$ cycle between 0 V and 3 V, and is about 1100 mAh/g at the $100^{th}$ cycle between 0 V and 3 V. The maximum volume change percentage of the lithium ion battery during the cycling is about 50% of the original volume.

Depending on the embodiment, certain steps of the methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

Finally, it is to be understood that the above-described embodiments are intended to illustrate rather than limit the present disclosure. Variations may be made to the embodiments without departing from the spirit of the present disclosure as claimed. Elements associated with any of the above embodiments can be associated with any other embodiments. The above-described embodiments illustrate the scope of the present disclosure but do not restrict the scope of the present disclosure.

What is claimed is:

1. A method for cycling a sulfur composite lithium ion battery, the method comprising a step of charging and discharging the sulfur composite lithium ion battery at a first voltage range having a predetermined highest voltage and a predetermined lowest voltage, wherein the sulfur composite lithium ion battery comprises a cathode active material and an anode active material, the cathode active material comprising a sulfur composite, the sulfur composite is a sulfur based polymer, the anode active material is lithium metal, the first voltage range is smaller than and located in a range having a charge cutoff voltage and a discharge cutoff voltage, the charge cutoff voltage is 3V, and the discharge cutoff voltage is 0V, the first voltage range is 30% to 50% smaller than the range from 0V to 3V, and the step of charging and discharging satisfies at least one condition of (1) and (2):

(1) the predetermined lowest voltage of the first voltage range is larger than the discharge cutoff voltage of the sulfur composite; and (2) the predetermined highest voltage of the first voltage range is smaller than the charge cutoff voltage of the sulfur composite, wherein the cycling the sulfur composite lithium ion battery is defined as:

when a voltage of the sulfur composite lithium ion battery is charged to the predetermined highest voltage, the charging stops;

when the voltage of the sulfur composite lithium ion battery is discharged to the predetermined lowest voltage, the discharging stops; and the sulfur composite lithium ion battery is not charged above the charge cutoff voltage and the sulfur composite lithium ion battery is not discharged below the discharge cutoff voltage.

2. The method of claim 1, wherein the sulfur composite lithium ion battery is cycled at the first voltage range for at least 5 cycles.

3. The method of claim 1, wherein the sulfur composite lithium ion battery has a plurality of reversible redox reactions at different voltages, the first voltage range only has one reversible redox reaction processed during the charging and discharging.

4. The method of claim 1, wherein the sulfur composite is sulfur grafted poly(pyridinopyridine), and the predetermined lowest voltage Vx and the predetermined highest voltage Vy satisfy $0.25V<Vx<2.25V<Vy$, or satisfy $Vx<0.1V<Vy<2V$.

5. The method of claim 1, wherein the sulfur composite is a product formed from a pyrolysis reaction of a mixture of conducting polymer and elemental sulfur.

6. The method of claim 1, wherein the sulfur composite is selected from the group consisting of sulfur grafted poly(pyridinopyridine), sulfurized polystyrene, sulfurized polyoxyethylene, sulfurized polyvinyl alcohol, sulfurized poly(vinylidene chloride), sulfurized poly(vinylidene difluoride), sulfurized polyvinylchloride, sulfurized polyvinyl fluoride, sulfurized poly(1,2-dichloroethylene), sulfurized poly(1,2-difluoroethylene), sulfurized polymethyl methacrylate, sulfurized phenolic resin, and combinations thereof.

7. The method of claim 6, wherein the sulfur grafted poly(pyridinopyridine) comprises a poly(pyridinopyridine) matrix and a plurality of poly-sulfur groups dispersed in the poly(pyridinopyridine) matrix, each of the plurality of poly-sulfur groups consists of one or more sulfur elements represented by a formula of $S_x$, wherein x is an integer between 1 and 8, and the plurality of poly-sulfur groups are combined with the poly(pyridinopyridine) matrix with covalent bonds.

8. The method of claim 7, wherein sulfur grafted poly(pyridinopyridine) comprises at least one chemical group of formulas:

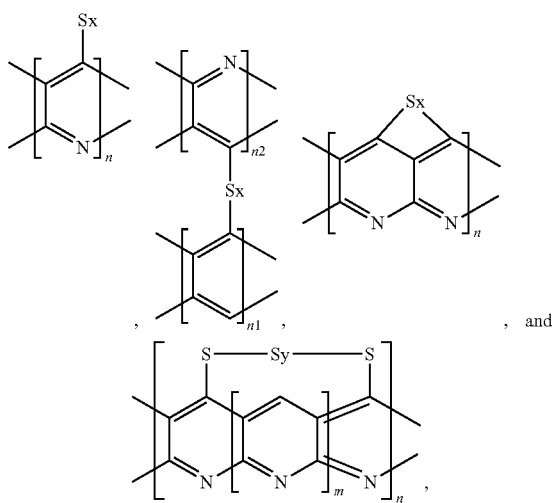

wherein n, n1, and n2 are an integer larger than 1, m and y are both an integer larger than 0.

9. The method of claim 6, wherein the sulfur grafted poly(pyridinopyridine) comprises a poly(pyridinopyridine) matrix and elemental sulfur dispersed in the poly(pyridinopyridine) matrix.

10. The method of claim 9, wherein the elemental sulfur has a shape of particles or grains, and one elemental sulfur particle is one sulfur molecule or a sulfur atom cluster consisting of a plurality of sulfur atoms.

11. A method for cycling a sulfur composite lithium ion battery, the lithium ion battery comprising a cathode active material and an anode active material, the cathode active material comprising a sulfur composite, the sulfur composite is a sulfur based polymer, the anode active material is lithium metal, and the method comprising:

S1, charging and discharging the lithium ion battery at a first voltage range having a first predetermined highest voltage and a first predetermined lowest voltage, wherein when a voltage of the lithium ion battery is charged to the first predetermined highest voltage, the charging stops, and when the voltage of the lithium ion battery is discharged to the first predetermined lowest voltage, the discharging stops; and S2, after the step S1, charging and discharging the lithium ion battery at a second voltage range having a second predetermined highest voltage and a second predetermined lowest voltage, wherein the second predetermined highest voltage of the second voltage range is smaller than or equal to 3V, and the second predetermined lowest voltage of the second voltage range is larger than or equal to 0V, when the voltage of the lithium ion battery is charged to the second predetermined highest voltage, the charging stops, and when the voltage of the sulfur composite lithium ion battery is discharged to the second predetermined lowest voltage, the discharging stops;

wherein the step S1 satisfies at least one condition of (1) and (2):
(1) the first predetermined lowest voltage of the first voltage range is larger than the second predetermined lowest voltage of the second voltage range, the first predetermined highest voltage of the first voltage range is smaller than or equal to the second predetermined highest voltage of the second voltage range; and
(2) the first predetermined highest voltage of the first voltage range is smaller than the second predetermined highest voltage of the second voltage range, the first predetermined lowest voltage of the first voltage range is larger than or equal to the second predetermined lowest voltage of the second voltage range.

12. The method of claim 11, wherein the first voltage range is 30% to 50% smaller than the second voltage range.

13. The method of claim 11, wherein the sulfur based polymer comprises a conducting matrix and sulfur dispersed in the conducting matrix.

* * * * *